(12) United States Patent
Wang

(10) Patent No.: US 8,845,109 B2
(45) Date of Patent: Sep. 30, 2014

(54) PROJECTION SYSTEM BASED ON SELF EMITTING DISPLAY PANEL

(76) Inventor: Yong-Jing Wang, Valencia, CA (US)

( * ) Notice: Subject to any disclaimer, the term of this patent is extended or adjusted under 35 U.S.C. 154(b) by 860 days.

(21) Appl. No.: 12/744,014

(22) PCT Filed: Nov. 21, 2008

(86) PCT No.: PCT/US2008/084372

§ 371 (c)(1),
(2), (4) Date: Sep. 13, 2010

(87) PCT Pub. No.: WO2009/067678

PCT Pub. Date: May 28, 2009

(65) Prior Publication Data

US 2010/0328550 A1 Dec. 30, 2010

Related U.S. Application Data

(60) Provisional application No. 60/989,922, filed on Nov. 24, 2007.

(51) Int. Cl.
*H04N 9/31* (2006.01)
*G03B 21/14* (2006.01)

(52) U.S. Cl.
USPC ............................. 353/31; 359/634; 359/10

(58) Field of Classification Search
USPC ............... 353/31, 33, 34, 37, 94; 349/5, 7, 8;
348/742, 743, 750, 757, 800, 801;
359/204.1, 629, 634, 555; 251/431;
438/48, 54, 69
See application file for complete search history.

(56) References Cited

U.S. PATENT DOCUMENTS

| | | | | |
|---|---|---|---|---|
| 5,144,462 A | * | 9/1992 | Otsuka et al. | 349/8 |
| 5,874,929 A | * | 2/1999 | Opower et al. | 345/32 |
| 5,917,280 A | | 6/1999 | Burrows et al. | |
| 5,990,983 A | * | 11/1999 | Hargis et al. | 348/758 |
| 6,030,700 A | * | 2/2000 | Forrest et al. | 428/336 |
| 6,124,954 A | * | 9/2000 | Popovich et al. | 359/13 |
| 6,259,423 B1 | * | 7/2001 | Tokito et al. | 345/76 |
| 6,274,980 B1 | | 8/2001 | Burrows et al. | |
| 6,337,492 B1 | | 1/2002 | Jones et al. | |
| 6,573,579 B1 | | 6/2003 | Ho et al. | |
| 6,717,358 B1 | | 4/2004 | Liao et al. | |
| 6,814,442 B2 | * | 11/2004 | Okuyama et al. | 353/20 |
| 6,890,078 B2 | * | 5/2005 | Koide | 353/31 |
| 6,939,012 B2 | | 9/2005 | Cok et al. | |
| 7,075,231 B1 | | 7/2006 | Liao et al. | |
| 2004/0021831 A1 | * | 2/2004 | Koide | 353/31 |
| 2004/0108973 A1 | * | 6/2004 | Kiser et al. | 345/32 |
| 2009/0190043 A1 | * | 7/2009 | Pei et al. | 348/744 |
| 2010/0020289 A1 | * | 1/2010 | Kamijima | 353/31 |
| 2010/0033685 A1 | * | 2/2010 | Seo et al. | 353/31 |
| 2010/0245775 A1 | * | 9/2010 | Rubinshtein et al. | 353/31 |
| 2011/0134317 A1 | * | 6/2011 | Wang | 348/441 |
| 2011/0249197 A1 | * | 10/2011 | Sprowl et al. | 348/744 |

* cited by examiner

*Primary Examiner* — William C Dowling (57) ABSTRACT

A projection system based on self emitting display panels is described, in which the projection technology involves organic/inorganic electroluminescent display panels with spatially separated color segments. The color pictures are shown in three spatially separate segments. A color combination mechanism, such as dichroic mirrors, are used to merge the three color pictures to a color picture. One of the advantages of the present invention is that only the on state pixel is driven to a bright state that uses energy. The off state pixel need not be driven to a bright state and therefore the energy consumption is virtually nothing. Another advantage is that the system does not require a separate light source and display panel. Therefore the projection system can be made very compact, which is extremely useful for portable projection systems.

11 Claims, 9 Drawing Sheets

PROJECTION SYSTEM BASED ON SELF EMITTING DISPLAY PANEL

This application claims priority to U.S. Provisional Patent Application Ser. No. 60/989,922, entitled "Projection Device Based on Self Emitting Display Panel" filed on Nov. 24, 2007, the entire content of which is hereby incorporated by reference.

BACKGROUND

The invention generally pertains to projection display systems and more particularly to a new color projection display system using one or more self emitting display panels.

Existing projection display systems typically comprise a light source, one or more display panels that modulate the light from the light source, and a projection lens that collects the modulated light and projects it to the screen. The display panel typically employs a liquid crystal display ("LCD") or Micro-electromechanical Systems ("mems") device. There are several problems with the existing technology. For example, the illumination system including the light source is complex in structure, expensive, and bulky. Typically, it needs several relay lenses, light pipe and other optical components. In addition, the light efficiency of the projection system is low. In the pixels of a display that is in the on-state, the light is directed to the screen to generate pictures. In the pixels of an off-state display, the light is either absorbed or deflected away from the screen to generate a dark picture. Though the picture is dark, it requires the same amount of energy as a bright picture. The light energy is wasted in the pixels of an off-state display.

U.S. Pat. No. 6,573,579 discloses a projector based on Organic Light-Emitting Diode ("OLED") panels, which is one type of emissive display. But the disclosed projector has a problem that cannot be solved. If the emitters generate red, green, and blue ("RGB") colors directly, existing manufacturing processes cannot make RGB emitters with ultra fine pitch. This is because the moisture in processing of pixelization reduces the life time of OLED panels, so the resolution is too low for a projection system. If the emitters generate RGB through a color filter, ⅔ of the light is cut off. Therefore the light efficiency is too low.

U.S. Pat. No. 6,939,012B discloses a laser projector that uses an OLED pixel to pump another organic cavity. The cavity length of a laser depends on its emitting color. Different colors require different cavity lengths. It is very hard to manufacture these OLED pixels and cavities in a micro display where the size of pixels is very small.

As a result, there exists a current need for a simple, low cost and compact projection system with viable manufacturability for high resolution display.

SUMMARY

The present invention uses at least one self emitting display panel as the display panel and a new color management system to produce color pictures. The self emitting display can be any inorganic Electroluminescence ("EL") device, also known as a light emitting device ("LED"), or Organic Light Emitting Diodes ("OLED"). This invention, a new projection display system based on one or more self emitting panels comprises:

1) an LED or OLED display panel with a plurality of pixels, in which 2) the LED or OLED display panel has at least two segments that display information pertaining to corresponding colors, and 3) a projection lens system that can combine the color segments together into a color picture by using an angular-color-mixing technique.

Accordingly, there are several objects or advantages of the invention compared with existing projection systems. The objects or advantages are:

(a) to reduce the cost of the display panels since there is no separate illumination system in the projection system, and (b) to reduce the size of the projection system by combining the light source and display panel into a single component, and (c) to reduce the power consumption of the system because the power of each pixel is a function of the brightness value of such pixel.

Further objects and advantages of the present invention compared with existing projection systems are:

(a) to increase the light efficiency due to no polarization loss, (b) to eliminate color artifacts, (c) to reduce the bandwidth requirement for driving electronics and response time of display panels, (d) to remove the color filter in the panel, thus reducing the cost of the panel and increasing the panel's lifetime and reliability, (e) to increase the brightness of the projection system by utilizing a photonic lattice, microcavities, or a combination of both in the construction of the device, and (f) to increase the brightness and lifetime of the projection device by utilizing tandem or stacked layers of OLED.

Still further objects and advantages will become apparent from the following description and accompanying drawings. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

FIG. 3 (a) is a schematic diagram of a design of a projection lens of the present invention.

FIG. 3 (b) is a schematic diagram of an arrangement of dichroic mirrors according to the present invention.

FIG. 4 (a) is a schematic diagram of a back plane according to the present invention.

FIG. 4 (b) is a schematic diagram of an embodiment of a display panel using three self emitting panels according to the present invention.

DETAILED DESCRIPTION

The present invention is presented in terms of different preferred embodiments, with several different design configurations, for a projection system based on self emitting display panels. The present invention should not be limited to any of these embodiments.

Figure 1:
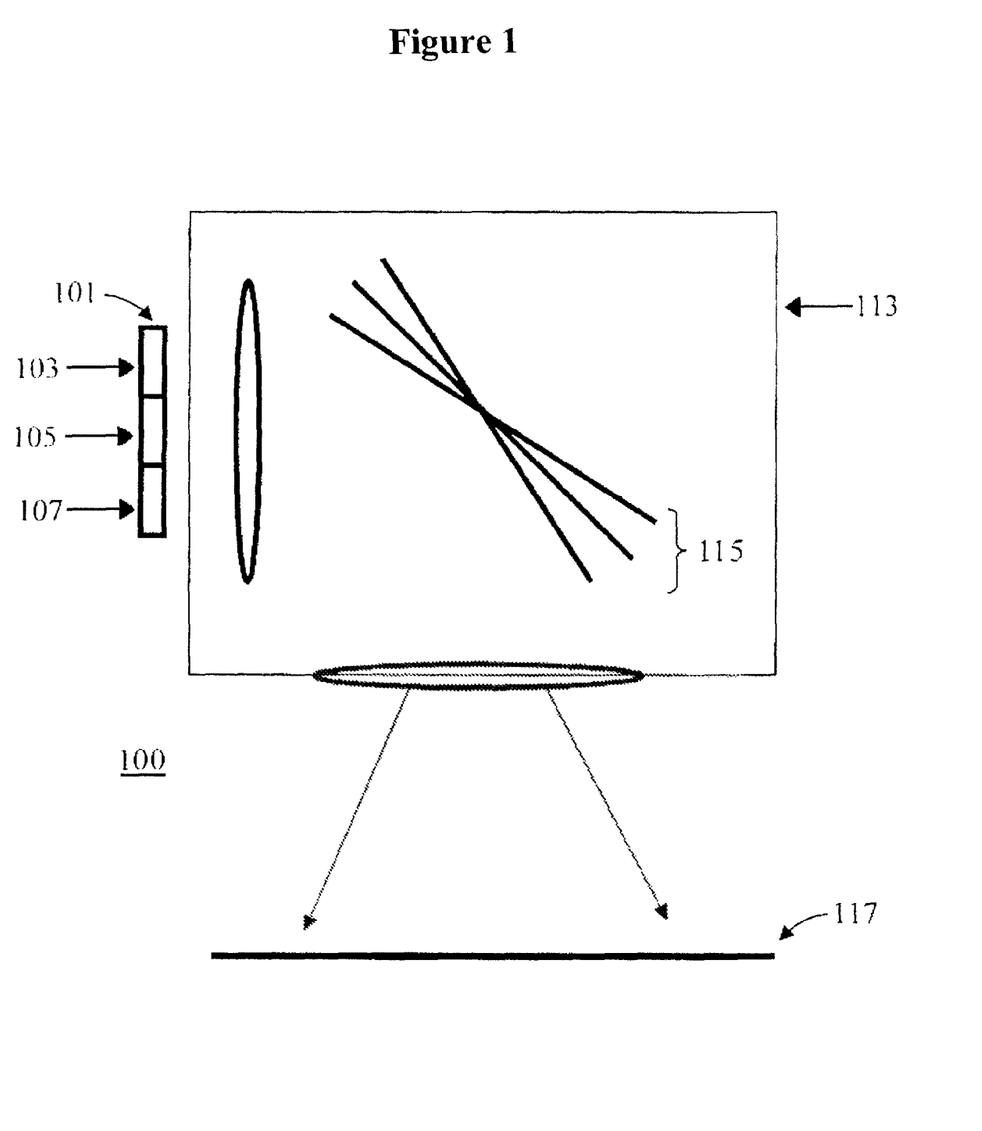
FIG. 1 is a schematic diagram of an embodiment of the present invention wherein a single self emitting panel is used as a display panel.

FIG. 1 shows a first preferred embodiment of a display system 100. The display system 100 is comprised of a self emitting display panel 101, which is typically an LED panel, an OLED panel or other emitting display technology that is known to those skilled in the art. OLED technology generally includes polymer OLED and small molecule OLED. OLED materials for display panels are provided commercially by several companies, including Eastman Kodak Company (Rochester, N.Y.), Universal Display Corporation (Ewing, N.J.), and Sumitomo Corporation (Sapporo, Japan). The panel 101 has a plurality of pixels corresponding to pixels of a displayed picture. The plurality of pixels emits at least two primary colors. All color pixels are arranged into at least two side by side segments 103, 105, 107 that display information pertaining to at least two colors emitted by the pixels. A light collection/optical device 113 projects the color pictures onto a screen 117. There are at least two dichroic mirrors 115 in the light collection/optical device. The mirrors 115 tilt at different angles so that pictures of different colors are combined together to produce a color picture on the screen 117. Because the colors are distributed a different angles in the position of dichroic mirrors 115, this technique is referred to as angular-color-mixing technique.

There are many alternative forms of projection lenses that can be used in the current invention. At least two dichroic films are made of multi-layer coatings, or other selective reflective materials are inserted into the projection lens to combine the pictures of different colors to form a color image. The position of the dichroic mirrors can be in front of, within or after the main projection lens. Those skilled in the art should appreciate that there are many different forms of projection lenses. Those skilled in the art should also realize that such equivalent constructions do not depart from the spirit and scope of the invention in its broadest form.

Figure 2:
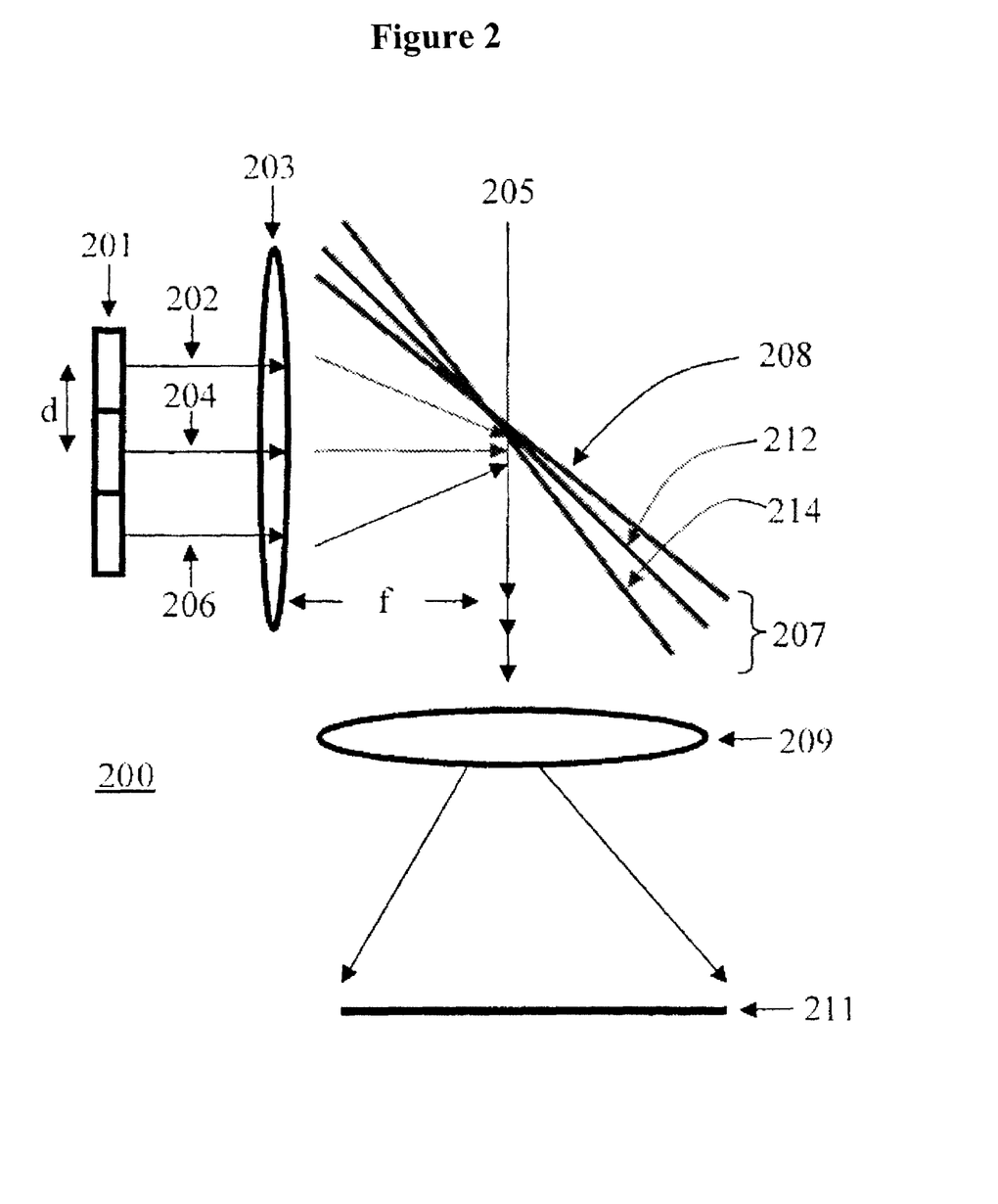
FIG. 2 is a schematic diagram of a projection lens of the present invention.

The description of operational principle is shown in FIG. 2, which illustrates a display system 200. The light coming from a display panel 201 passes through a first lens unit 203, having at least one lens with an effective focal length off. The different color segments of the panel 201 are shifted by a distance of d. At the focal plane 205 of the first lens unit 203, the different color lights 202, 204, 206 emitted by the different color segments are separated by an angle that is less than 90 degrees and which is determined by atan(d/f).

Since the different color pictures are at different relative positions, the color pictures will be encoded by angles after the color light passes the first lens unit. The dichroic mirrors 207 are placed at the plane 205 to decode the angular information. There are at least two dichroic mirrors, and in this example there are three dichroic mirrors 208, 212, 214, tilting at different angles. The dichroic mirror 208 only reflects the color light 202 and transmits the other color lights. The dichroic mirror 212 only reflects the color light 204 and transmits the other color lights. The dichroic mirror 214 only reflects color light 206 and transmits the other color lights.

The tilting angles between the dichroic mirrors are determined by atan(d/f)/2. Therefore, different color pictures are redirected at the same angle. Finally, the second lens unit 209 with at least one lens projects the picture onto a screen 211 to form a color image. FIG. 2 only shows the operation principle of said projection lens. The actual design of the projection lens is determined by engineering tools.

Figure 3:
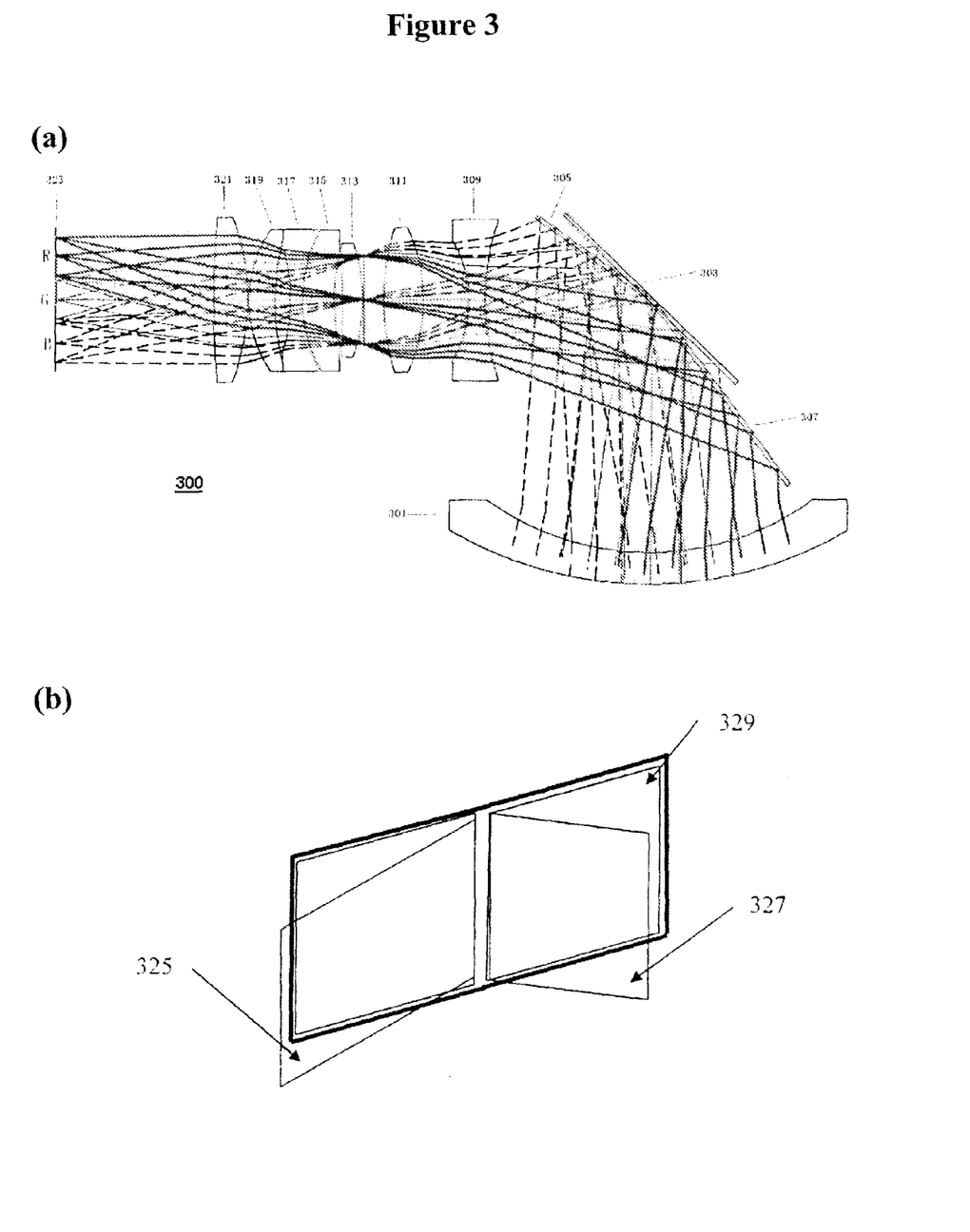

An embodiment of the projection lens system 300 is shown in FIG. 3(*a*), where the said dichroic mirrors 303, 305, and 307 have a simple arrangement. The first lens unit, which is made up in this example of lenses 309, 311, 313, 315, 317, 319, and 321, is designed to make sure the light from the top color segment and the light from the bottom color segment from display panel 323 (which would correspond to 202 and 206, respectively, in FIG. 2) are substantially departed from each other in one plane in the optical path. The dichroic mirrors are put at this location. Therefore, the dichroic mirror 307 reflects only light from top color segment "R". The dichroic mirror 305 only reflects the light from bottom color segment "B". The dichroic mirror 303 only reflects the light from the middle color segment "G". Therefore the dichroic mirrors 303, 305, and 307 need not be crossed with each other. The tilting angle of the dichroic mirrors should be greater than zero degrees and less than 90 degrees. The light from the middle color segment passes through dichroic mirrors 305 and 307, and therefore the thickness of said dichroic mirrors 305 and 307 should be substantially thin to reduce aberration. The thicknesses of said mirrors vary from about 0.01 mm to about 100 mm. Light leaving the dichroic mirrors 303, 305, 307 then enters the second lens unit 301. An alternate arrangement of dichroic mirrors 325, 327, 329 is shown in FIG. 3(*b*), in which the tilting angle of these mirrors could vary from greater than zero degrees to 45 degrees.

There are not any optical components inserted between display panel 323 and the first lens 321. Therefore, the first lens 321 can be placed substantially close to the panel 323 and function as a field lens. In a preferred embodiment, lens 321 and panel 323 are laminated together using optical glue. The field lens dramatically increases the collection efficiency and telecentricity of the projection lens.

The tilted dichroic mirrors may cause image distortion, such as keystone distortions. To insure that the red, green and blue ("RGB") color images converge together, the distortion should be corrected. In one embodiment, the distortion is corrected electronically to achieve a good convergence of color picture. An image processor pre-processes the R G B images to add pre-distortion onto them. This distortion will be compensated by the distortion caused by the optical system to produce a substantially distortion-free image.

The distortion can also be corrected by optical methods such as field lenses, prism, and Fresnel lens. The field lenses could be tilted and shifted at a specific angle to correct the distortion. The field lenses can also be a glass wedge or a prism with a certain angle to correct the distortion.

The dichroic mirrors in the above embodiments can be arranged in various designs. Those skilled in the art should appreciate that there are many different forms of optical layouts to arrange one or more dichroic mirrors at different angles. These different arrangements do not depart from the spirit and scope of the invention in its broadest form. Those skilled in the art should also appreciate the need for other mechanical parts or methods, such as adjustment screw and glues, to adjust or mount all the optical substrates and wedges. These different mechanical forms do not depart from the spirit and scope of the invention in its broadest form.

In another design configuration, the dichroic minors can be replaced by other color selective refraction/diffraction/reflection components, such as a grating or a hologram. In this design configuration, the light path can be deflected 90 degrees or be a straight light path.

Figure 4:
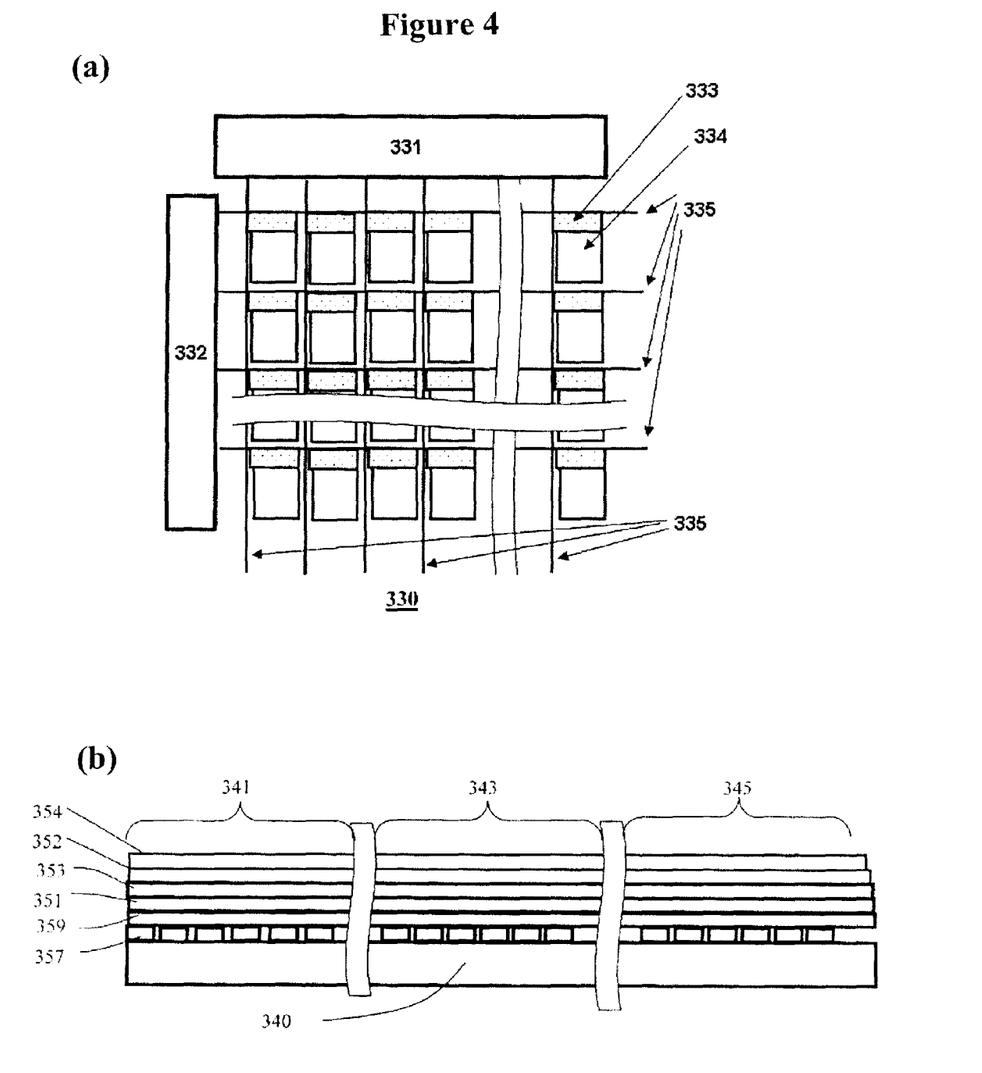

The self emitting panel described in preferred embodiments can also comprise a back plane that can apply voltage/current to plural pixels of the self emitting panel to generate a high resolution picture. A general structure of a back plane 330 is shown in FIG. 4(*a*). The back plane 330 includes a column driver 331 and a row driver 332. There should be at least one thin film transistor 333 for every OLED pixel 334 of the back plane 330 so the data signal can control every pixel of the panel independently. A series of electrodes 335 runs between the pixels 334. In some embodiments, at least two transistors are used per pixel for better control of the signal and current.

A cross section of an OLED display panel having a back plane is shown in FIG. 4(*b*). Back plane 340 contains transistors (not shown). Pixels 341, 343, and 345 are arranged into segments in the back plane. Pixels 341 control a first primary color and are arranged at one end of the back plane 340. Pixels 343 control a second primary color and are arranged at a middle area of the back plane 340. Pixels 345 in the back plane control a third primary color and are arranged at another end of the back plane 340. OLED pixels with corresponding colors are deposited on top of the pixels on the back plane. OLED pixels in this embodiment are made up of two electrodes 354 and 357, an anode and cathode (not shown), an electron transport layer 352, an emissive layer 353, a hole transport layer 351, and a hole-injection layer 359. At least one of these layers is pixelized so that the back plane can control the OLED pixel individually. Those skilled in the art should appreciate that there are many different forms of OLED structure. These different embodiments do not depart from the spirit and scope of the invention in its broadest form.

Figure 5:
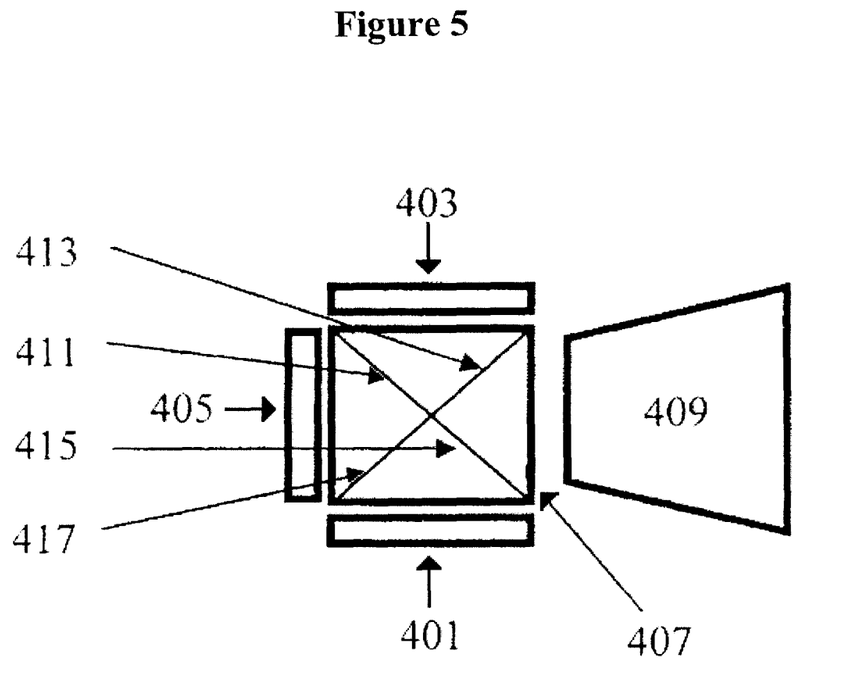
FIG. 5 is a schematic diagram of another embodiment of the present invention wherein three self emitting panels are used as the display panel.

In an additional embodiment of present invention, as shown in FIG. 5, three self emitting panels 401, 403, 405 display the red, green, and blue pictures separately. A color combining device 407 is used to combine the red, green, and blue pictures to form color images through projection lens 409. The color combining device 407 can be a color prism or a color cube, also known in the art as an x-cube, or other devices known in the art. In this example, it is a color cube comprising 4 reflective surfaces 411, 413, 415, and 417. The wave length response of the surfaces are determined by following rules. Surface 411 transmits the color light from panel 405 while reflects the color light from panel 403. Surface 413 transmits the color light from panel 405 while reflects the color light from panel 401. Surface 415 transmits the color light from panel 405 while reflects the color light from panel 403. Surface 417 transmits the color light from panel 405 while reflects the color light from panel 401. Surfaces 411 and 415 are located substantially on the same plane. Surfaces 413 and 417 are located substantially on the same plane. There are specially designed dichroic coating layers on surfaces 411, 413, 415, and 417 that selectively reflect and transmit the color picture, thus merging the color pictures into a color picture. Surface 411 and surface 417 can be embedded within a prism to form a color combination prism or can be made from four glass substrates.

One of the advantages of the present invention is that only the "on-state" pixel is driven to a bright state that consumes energy. The energy is a function of the brightness intensity of such a pixel. The "off-state" pixel (i.e., the dark pixel) need not be driven to a bright state, and therefore the energy consumption is zero. The other advantage is that the light source and display panel are constructed into one component. Therefore the projection system can be made very compact. This is extremely useful for portable projection system.

The brightness of the self emitting panel is one of the factors that determines the brightness of projected picture. The brightness can be varied from 100 nits to 10^9 nits. To drive the self emitting panel at this brightness will cause life time problems. There are several methods to solve this problem.

Figure 6:
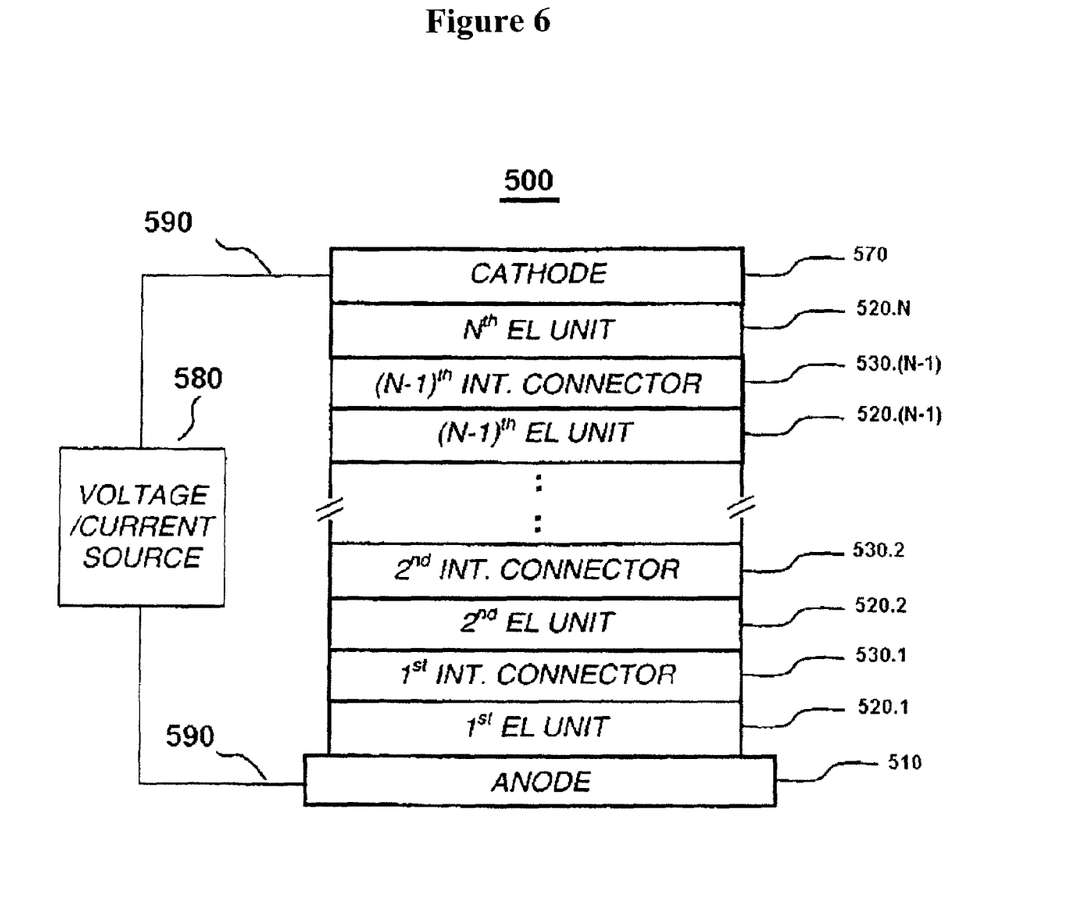
FIG. 6 is a schematic diagram of a tandem OLED pixel of the present invention.

In another embodiment as shown in FIG. 6, each pixel of the OLED display panel 500 is comprised of several stacking OLED layers on top of each other in a so-called tandem design. The tandem OLED has an anode 510 and a cathode 570, at least one of which is transparent. Disposed between the anode and the cathode are N number of organic OLED (or EL) units 520, where N is an integer greater than 1. For example, starting adjacent to the anode 510, there is organic OLED unit 520.1, and finishing adjacent to the cathode 570, there is organic OLED unit 520.N. There are a total of N−1 intermediate connectors associated with N OLED units, which are located between each layered OLED unit, and they are designated 530.1 to 530.(N−1). For example, starting adjacent to organic OLED unit 520.1, there is intermediate connector 530.1, and finishing adjacent to organic OLED unit 520.N, there is intermediate connector 530.(N−1). This method decreases the required brightness of each OLED layer, for a given total brightness of the projector, and hence, increases the lifetime of the device. The tandem OLED display panel 500 is connected to voltage/current source 580 through electrical connectors 590. The tandem OLED pixels are preferably controlled by a back plane to emit a high brightness picture. There are many different tandem OLED structures described in the art, including but not limited to those disclosed in U.S. Pat. Nos. 6,274,980, 5,917,280, 6,337,492, 7,075,231, and 6,717,358. Those skilled in the art should also realize that such equivalent constructions do not depart from the spirit and scope of the invention in its broadest form.

Figure 7:
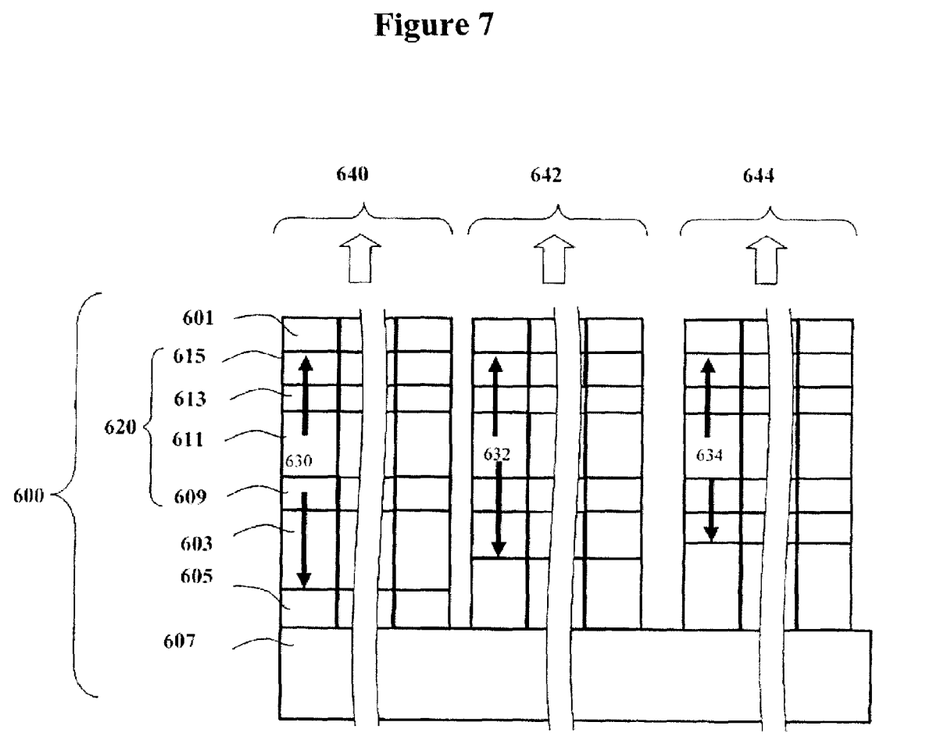
FIG. 7 is a schematic diagram of an OLED micro display panel of the present invention with micro cavity structure.

OLED devices having a micro cavity structure have been disclosed previously in U.S. Pat. No. 6,939,012 and should be understood by those of skill in the art. Such a micro cavity can yield highly efficient emission with very pure colors. However, R G B colors need different optical lengths. It is very difficult to fabricate the different micro cavities in fine pitch for different color sub pixels in micro display panels. The present invention uses color segments instead of color sub pixels for generating a color image without pixelization. It is possible to make different cavities with very fine pitch. Another embodiment of the current invention is an OLED display panel for a projector having a cavity structure as shown in FIG. 7. The cavity structure includes at least one OLED medium 620, which includes hole transporting layer 609, hole injecting layer 611, light emitting layer 613, and electron transporting layer 615. Microcavity pixel 600 also includes a substrate 607 with transistors (not shown) and a cavity spacer 603. The substrate 607 with transistors controls every pixel to generate light individually according to the input signal. A reflector 605 and a semitransparent reflector 601 are respectively disposed on opposite sides of the light-emitting layers and arranged to resonate light produced by such layers such that the light produced by the device has spectral component for desired color and is highly collimated. Pixels 640 generate one primary color and are arranged together in one end of the display panel. Pixels 642 generate a second primary color and are arranged together in the middle of the display panel. Pixels 644 generating a third primary color are arranged together in another end of the display panel. Although the pixels in different colors 640, 642, and 644 have different optical path lengths 630, 632, and 634, there are only three large zones with different optical path lengths. The different optical path lengths can be reconciled easily by a suitable method, such as a mask method.

This micro cavity structure not only increases the coupling efficiency but also significantly collimates the light from the device. The collection efficiency is thereby increased. Those skilled in the art should also realize that there are many different cavity structures that could be used. Such equivalent constructions do not depart from the spirit and scope of the invention in its broadest form.

Various methods can be used to increase the coupling efficiency and as such increase the brightness of the OLED panels. Other embodiments of the present invention include: (1) applying a corrugated microstructure on a substrate to increase the coupling efficiency through Bragg-scattering the light bounded in lateral guided modes, (2) modifying the substrate surface to reduce the TIR loss at a substrate/air interface, such as incorporation of a monolayer of silica microsphere in the substrate, shaping of device into a mesa structure, patterning a polymer microlens array, or directly placing a large size hemispherical lens directly on top of the substrate surface, (3) inserting a highly porous medium between an ITO layer and supporting substrates to scatter the light out, and (4) using a 2 dimensional photonics lattice to convert light in the guided mode to extracted mode. All of these methods can be used individually or combined to increase the brightness of an OLED panel for projectors. In one preferred embodiment, the OLED panel comprises both tandem structure and micro cavity structure.

Figure 8:
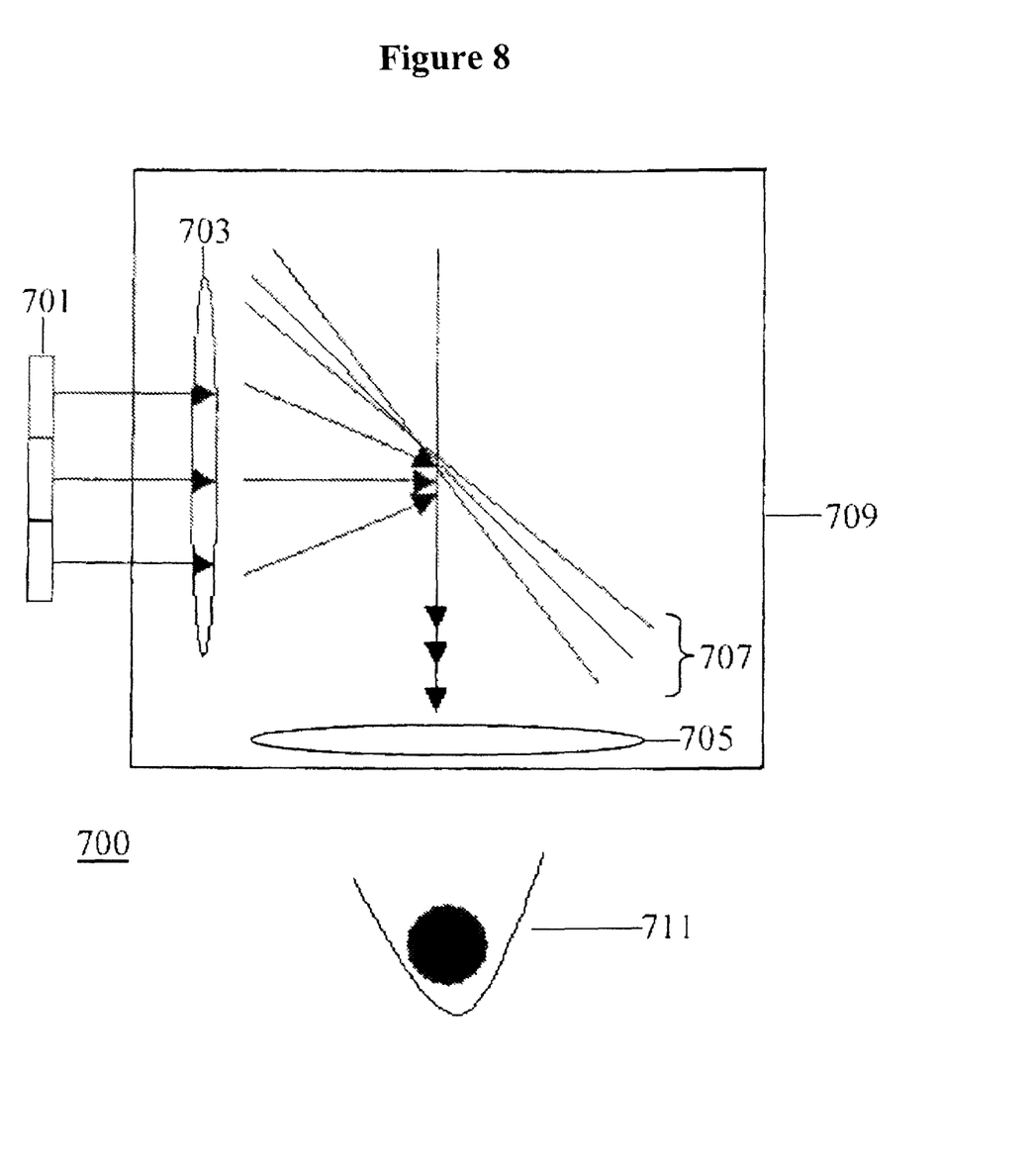
FIG. 8 is a schematic diagram of another embodiment of the present invention wherein the full color image is generated for a viewer's eyes in a near-to-eye display.

The display screen in the above embodiments can be replaced by a viewer's eyes for near-to-eye applications. In an additional embodiment, a near-to-eye virtual display system 700 comprises a self emitting panel 701, and a light collecting system 709 having at least two dichroic mirrors 707 and lens units 703 and 705, as shown in FIG. 8. The dichroic mirrors 707 tilt the beams at different angles to form a convergent red green blue beam. The light collection system 709 produces a full color image visible to a human eye 711.

Alternatively, the display panel in the above embodiments can have at least two panels with different colors that are aligned substantially close to each other instead of a single panel having multiple color segments Those skilled in the art should also realize that the display panel on all the proceeding embodiments can consist of at least two panels aligned substantially close to each other instead of a single panel. Such equivalent constructions do not depart from the spirit and scope of the invention in its broadest form.

In all the above embodiments, three primary color systems are used. Those skilled in the art should realize all embodiments are also applicable to other color systems, such as four, five or even more primary color systems by using more than three color segments on the display panels. In all the above embodiments, side by side color segment arrangement is used. Those skilled in the art should realize there exist other forms of color arrangement, such as delta arrangement.

Figure 9:
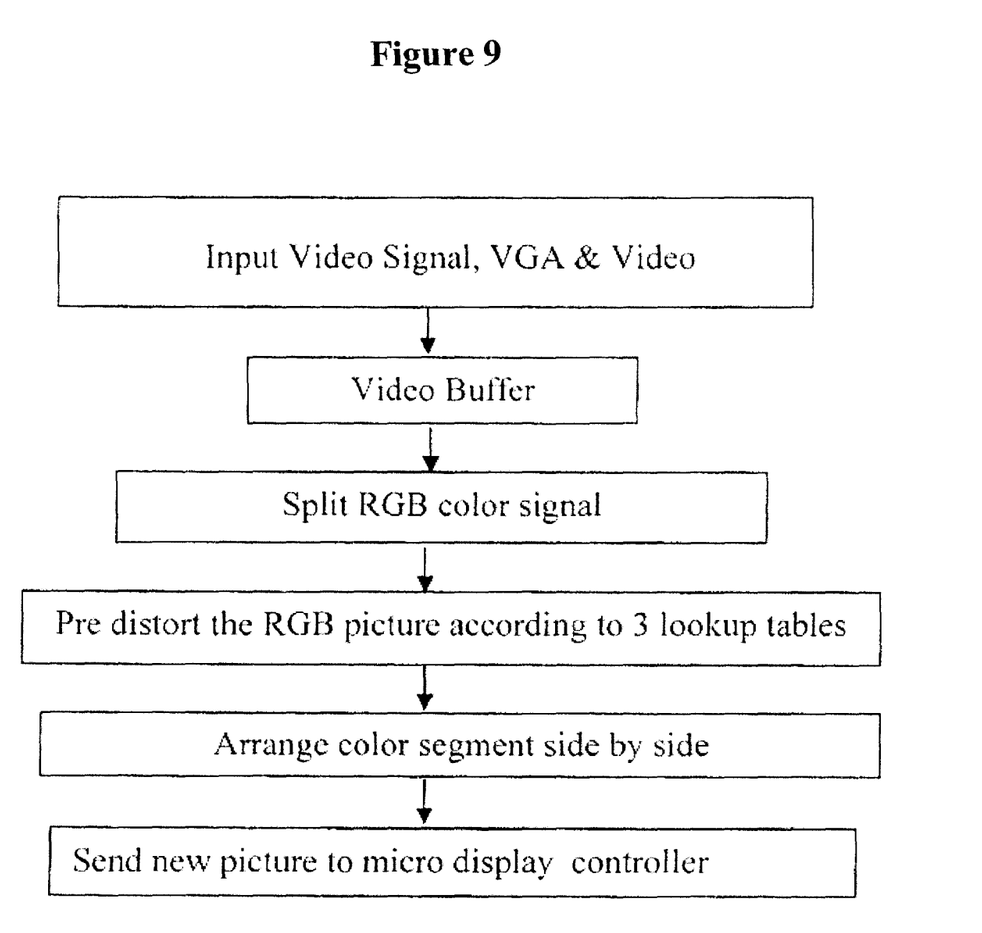
FIG. 9 is a function chart of image processing in the present invention.

To generate the picture required by the current invention, the image generation system requires the red green blue information of a picture to be displayed in side by side color segments. The optical system merges the color segments into a full color segment. Therefore a hardware or software mean is requires to process the video signal according to this requirement. The function of image processing is shown in FIG. 9. The function can be implemented by integrated circuit means such as FPGA or ASIC. First, a video signal is input and is buffered by a video buffer. Then, the RGB color signal is split. The RGB picture can then be pre-distorted according to 3 lookup tables that determine the pre-distortion required for a good convergence of three color pictures. The date in the 3 lookup tables can be obtained either by system simulation or in the procedure of alignment. Then the pre-distorted color pictures are arranged side by side to form a new data frame for the picture. Finally, the new picture is sent to a micro display controller to drive the display panel to generate the picture.

The projection system in the present invention increases the brightness and reduces the size and cost of the projectors. Thus, in some embodiments it might be used as part of the display systems in mobile phones and portable computers. Those of skill in the art are familiar with devices such as these. Certain preferred embodiments of the current invention therefore include antennas, data input devices, data storage devices, and data processors.

One preferred embodiment of the current invention is a portable electronic communication system comprising a projector using at least one self-emitting display panel according to the aspects of the current invention, an antenna for receiving and sending data or communications, and an electric system that controls the receiving, sending, inputting, and displaying of the data or communications.

Another preferred embodiment is a portable electronic communication system that comprises a projector using at least one self-emitting display panel according to the aspects of the current invention, at least one data input device, at least one data storage device, and at least one data processor.

REFERENCES CITED

The content of each of the documents listed below is hereby incorporated by reference.

U.S. Patent Documents

U.S. Pat. No. 5,917,280
U.S. Pat. No. 6,274,980
U.S. Pat. No. 6,337,492
U.S. Pat. No. 6,573,579
U.S. Pat. No. 6,717,358
U.S. Pat. No. 6,939,012
U.S. Pat. No. 7,075,231

What is claimed is:

1. An image projection system comprising:
at least one self emitting display panel, wherein the display panel has a plurality of pixels, wherein said pixels emit at least two colors and are arranged in at least two adjacent segments displaying portions of color information pertaining to each of said colors, and wherein the portions of color information displayed by the segments are separated from each other; and
a light collection and optical device, wherein the light collection and optical device combines the separated portions of color information to produce a color image, and
wherein the light collection and optical device comprises at least two dichroic mirrors tilted at different angles.

2. The image projection system of claim 1, wherein the at least two dichroic mirrors are titled at angles of greater than zero degrees and less than 90 degrees.

3. The image projection system of claim 1, wherein the at least two dichroic mirrors have thicknesses of about 0.01 mm to about 100 mm.

4. The image projection system of claim 1, wherein the at least two dichroic mirrors are positioned at a location where the portions of color information displayed by the segments are separated from each other.

5. The image projection system of claim 1, wherein one or more lens units generates an image on a viewer's eye.

6. An image projection system comprising:
- at least one OLED display panel, wherein the display panel has a plurality of pixels, wherein said pixels emit at least two colors and are arranged in at least two adjacent segments displaying portions of color information pertaining to each of said colors, and wherein the portions of color information displayed by the segments are separated from each other;
- a light collection and optical device, wherein the light collection and projection device combines the separated portions of color information to produce a color image, and wherein the light collection and optical device comprises two or more dichroic mirrors titled at different angles;
- an image processor for separating the portions of color information displayed by the segments from each other and for pre-distorting the portions of color information; and
- one or more lenses.

7. The image projection system of claim 6, further comprising at least two OLED panels, wherein the display panels are placed substantially close to each other.

8. The image projection system of claim 6, wherein the one or more lenses generates an image on a viewer's eye.

9. The image projection system of claim 6, further comprising a display screen.

10. The image projection system of claim 6, wherein the one or more lenses generates an image on the display screen.

11. An image projection system comprising:
- at least one self emitting display panel, wherein the display panel has a plurality of pixels, wherein said pixels emit at least two colors and are arranged in at least two adjacent segments displaying portions of color information pertaining to each of said colors, and wherein the portions of color information displayed by the segments are separated from each other; and
- a light collection and optical device, wherein the light collection and optical device combines the separated portions of color information to produce a color image, and
- wherein the light collection and optical device comprises a grating or a hologram to merge the adjacent segments together.

* * * * *